United States Patent
Park

(10) Patent No.: US 11,027,376 B2
(45) Date of Patent: Jun. 8, 2021

(54) AUTOMATIC PLUG MOUNTING SYSTEM FOR VEHICLE BODY

(71) Applicants: HYUNDAI MOTOR COMPANY, Seoul (KR); KIA MOTORS CORPORATION, Seoul (KR)

(72) Inventor: Sangkyu Park, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 230 days.

(21) Appl. No.: 16/394,206

(22) Filed: Apr. 25, 2019

(65) Prior Publication Data
US 2019/0329366 A1 Oct. 31, 2019

(30) Foreign Application Priority Data
Apr. 26, 2018 (KR) .......... 10-2018-0048219

(51) Int. Cl.
| | |
|---|---|
| B23P 19/02 | (2006.01) |
| B23P 19/00 | (2006.01) |
| B62D 25/24 | (2006.01) |
| B23P 19/12 | (2006.01) |
| B25J 11/00 | (2006.01) |
| B25J 15/00 | (2006.01) |
| B25J 19/02 | (2006.01) |

(52) U.S. Cl.
CPC ............ *B23P 19/02* (2013.01); *B23P 19/002* (2013.01); *B23P 19/12* (2013.01); *B25J 11/005* (2013.01); *B25J 15/0033* (2013.01); *B25J 15/0057* (2013.01); *B62D 25/24* (2013.01); *B23P 2700/50* (2013.01); *B25J 19/021* (2013.01)

(58) Field of Classification Search
CPC . B60J 10/45; B23P 19/001–002; B23P 19/02; B23P 19/04; B23P 19/12; B23P 2700/50; B25J 11/005; B25J 15/0033; B25J 15/0057; B25J 19/021–025; B62D 65/00; B62D 65/02; B62D 65/022; B62D 65/024; B62D 65/06
See application file for complete search history.

(56) References Cited

U.S. PATENT DOCUMENTS

| | | | | |
|---|---|---|---|---|
| 10,632,621 | B2 * | 4/2020 | Sobel | B23Q 7/10 |
| 2011/0182708 | A1 * | 7/2011 | Baudisch | B23P 19/006 414/737 |
| 2011/0209320 | A1 * | 9/2011 | Connolly | B23Q 17/2414 29/407.04 |
| 2018/0021953 | A1 * | 1/2018 | Kossmann | B23P 19/001 29/407.1 |
| 2019/0134817 | A1 * | 5/2019 | Turner | B23P 19/02 |

FOREIGN PATENT DOCUMENTS

DE 202015102825 U1 * 9/2016 .......... B25J 15/0019

* cited by examiner

*Primary Examiner* — Matthew P Travers
(74) *Attorney, Agent, or Firm* — Brinks Gilson & Lione

(57) ABSTRACT

An automatic plug mounting system for a vehicle body is disclosed to automatically mount plugs into exhaust holes in the vehicle body being transferred along a transfer line. The automatic plug mounting system includes: a handling robot which operates along a teaching path set to correspond to the exhaust holes; and a plug mounting tool which is installed at an arm of the handling robot and, when a cylinder is actuated, places the plugs into the correct positions at the exhaust holes while at least one of the plugs is restrained.

20 Claims, 18 Drawing Sheets

AUTOMATIC PLUG MOUNTING SYSTEM FOR VEHICLE BODY

CROSS-REFERENCE TO RELATED APPLICATION

This application claims priority to and the benefit of Korean Patent Application No. 10-2018-0048219, filed on Apr. 26, 2018, the entire contents of which are incorporated herein by reference.

FIELD

The present disclosure relates to a vehicle body assembly system, and more particularly, to an automatic plug mounting system for a vehicle body.

BACKGROUND

The statements in this section merely provide background information related to the present disclosure and may not constitute prior art.

Generally, in an automobile assembly process, foreign materials on a vehicle body are removed with wash water, and the vehicle body is painted to prevent corrosion of the vehicle body. The vehicle body's panels have exhaust holes so as to release the wash water and foreign materials involved in the washing process and the paint, etc. used in the painting process out of the vehicle body.

If the aforementioned exhaust holes in the vehicle body's panels are left open, various noises or exhaust gases may enter the vehicle during driving. For this reason, plugs are inserted into the exhaust holes in a fitting process.

In the fitting process, plugs are inserted by a worker's hands into the exhaust holes in the panels of the vehicle body, in the lower side of the vehicle body being transferred along a transfer line. The plugs inserted into the exhaust holes in the panels of the vehicle body have different shapes and sizes at different positions depending on the specification of the vehicle body.

We have discovered that, in the conventional art, the plugs are mounted into the exhaust holes in the panels of the vehicle body by pushing or hitting the plugs with the worker's fingers or palm, in the lower side of the vehicle body, and this may cause musculoskeletal disorders in workers from repetitive-motion work.

Moreover, in the conventional art, we also discovered that there are errors or failures in mounting the plugs into the exhaust holes in the panels of the vehicle body due to the worker's carelessness. This could lead to problems with the water tightness of a finished vehicle and cause exterior noise and exhaust gases to enter the vehicle.

Furthermore, because the plugs inserted into the exhaust holes in the panels of the vehicle body have different shapes and sizes at different positions depending on the specification of the vehicle body, mounting different types of plugs into the exhaust holes may lead to a plug mounting defect.

The above information disclosed in this Background section is only for enhancement of understanding of the background of the present disclosure and therefore it may contain information that does not form the prior art that is already known to a person of ordinary skill in the art.

SUMMARY

The present disclosure provides an automatic plug mounting system for a vehicle body which allows for automatically mounting plugs with different specifications into a vehicle body in cooperation with a robot.

An exemplary form of the present disclosure provides an automatic plug mounting system for a vehicle body, which is for automatically mounting plugs into exhaust holes in a vehicle body being transferred along a transfer line, the system including: i) a handling robot which operates along a teaching path set to correspond to the exhaust holes; and ii) a plug mounting tool which is installed at an arm of the handling robot and, when a cylinder is actuated, places the plugs into the correct positions at the exhaust holes while at least one of the plugs is restrained.

In the automatic plug mounting system for a vehicle body according to the exemplary form of the present disclosure, the handling robot may operate by a set torque, and may mount the plugs restrained by the plug mounting tool into the exhaust holes.

In the automatic plug mounting system for a vehicle body according to the exemplary form of the present disclosure, the plug mounting tool may include a socket module which is configured to move forward and backward through a punch rod which operates when the cylinder is actuated.

In the automatic plug mounting system for a vehicle body according to the exemplary form of the present disclosure, the socket module may include a socket member which restrains a flange portion of the plug by force-fitting.

In the automatic plug mounting system for a vehicle body according to the exemplary form of the present disclosure, the socket member may come in and out of contact with the circumference of the exhaust hole in the vehicle body by an action of the handling robot, and may be configured to reciprocate elastically along the axis of the punch rod.

Another exemplary form of the present disclosure provides an automatic plug mounting system for a vehicle body, which is for automatically mounting plugs into exhaust holes in a vehicle body being transferred along a transfer line in the upper section of a workplace, the system including: i) a handling robot which operates along a teaching path set to correspond to the exhaust holes; ii) a base frame fixed to the front end of an arm of the handling robot; iii) a mount frame connected to the base frame through a plurality of supports, at a given distance from the base frame; iv) a driving motor fixed to the mount frame; v) a rotational frame connected to the drive axis of the driving motor; vi) a plurality of punch rods which penetrate the circumference of the rotational frame and are placed at given intervals along the rotational direction of the rotational frame; vii) a socket module which is installed at one end of the punch rod penetrating the rotational frame in such a way as to reciprocate elastically along the axis of the punch rod; viii) a balance spring portion which is fitted to the punch rod and placed between the rotational frame and the other end of the punch rod; and ix) a driving cylinder which is fixed to the base frame and pushes the other end of the punch rod through an actuating rod.

In the automatic plug mounting system for a vehicle body according to the exemplary form of the present disclosure, the handling robot may be slidably installed on a guide rail in the longitudinal direction of the vehicle body by a driving part on the floor of the workplace.

In the automatic plug mounting system for a vehicle body according to the exemplary form of the present disclosure, rod guides to which one end of each punch rod is fitted may be installed on the rotational frame to guide the strokes of the punch rod.

In the automatic plug mounting system for a vehicle body according to the exemplary form of the present disclosure, the socket module may include: a socket member which is fitted into one end of the punch rod in such a way as to move along the axis of the punch rod and which restrains a flange portion of the plug by force-fitting; and a return spring installed at one end of the punch rod to exert an elastically repelling force to the socket member.

In the automatic plug mounting system for a vehicle body according to the exemplary form of the present disclosure, a snap ring may be installed at one end of the punch rod to support the return spring.

In the automatic plug mounting system for a vehicle body according to the exemplary form of the present disclosure, a supporting member supporting the plug and the socket member may be installed at one end of the punch rod.

In the automatic plug mounting system for a vehicle body according to the exemplary form of the present disclosure, the supporting member may include: a first portion supporting the center of the flange portion of the plug; and a second portion which is placed at a different elevation from the first portion and supports the inside bottom surface of the socket member and the circumference of the flange portion.

In the automatic plug mounting system for a vehicle body according to the exemplary form of the present disclosure, the socket member may be formed with a through-hole in the inside bottom through which one end of the punch rod passes.

In the automatic plug mounting system for a vehicle body according to the exemplary form of the present disclosure, a first supporting ridge supporting the second portion and a second supporting member supporting the circumferential edge of the flange portion of the plug may be formed on the inside wall surface of the socket member.

In the automatic plug mounting system for a vehicle body according to the exemplary form of the present disclosure, the balance spring portion may include: a first spring supporting the other end of the punch rod; and a second spring having a higher elastic coefficient than the first spring and supporting the rotational frame.

In the automatic plug mounting system for a vehicle body according to the exemplary form of the present disclosure, a pusher for pushing the other end of the punch rod may be installed at the leading edge of the actuating rod.

In the automatic plug mounting system for a vehicle body according to the exemplary form of the present disclosure, a vision sensor may be installed on the base frame through a mounting bracket.

Yet another exemplary form of the present disclosure provides an automatic plug mounting system for a vehicle body, which is for automatically mounting plugs into exhaust holes in a vehicle body being transferred along a transfer line, the system including: i) a handling robot which operates along a teaching path set to correspond to the exhaust holes; ii) a plug mounting tool which is installed at an arm of the handling robot and, when a cylinder is actuated, places the plugs into the correct positions at the exhaust holes while at least one of the plugs is restrained, and which mounts the plugs to the exhaust holes by a torque set for the handling robot; and iii) a plug transfer unit which transfers plugs with different specifications fed through at least a pair of feeders to the plug mounting tool.

In the automatic plug mounting system for a vehicle body according to the exemplary form of the present disclosure, the plug transfer unit may include: a transfer frame; a plug pick-up cylinder which is installed on the transfer frame so as to correspond to the end of each feeding line transferring a plug fed from each feeder, and which picks up the plug in an upward direction; a swivel member which has a pick-up socket for restraining a flange portion of the plug picked up by the plug pick-up cylinder by force-fitting and is rotatably installed on the transfer frame by a first actuator; a plug unloading cylinder which is installed on the swivel member and unloads the plug restrained by the pick-up socket in a downward direction; and a rotating plate which has a plurality of attachment members for loading a plug unloaded by the plug unloading cylinder and is rotatably installed on the transfer frame by a second actuator.

In the automatic plug mounting system for a vehicle body according to the exemplary form of the present disclosure, the plug pick-up cylinder may include a pick-up punch which is installed at the leading edge of an actuating rod and picks up the plug positioned below the feeding line in an upward direction.

In the automatic plug mounting system for a vehicle body according to the exemplary form of the present disclosure, the plug unloading cylinder may include an unloading punch which is installed at the leading edge of an actuating rod penetrating the pick-up socket and unloads the plug positioned above the attachment member to the attachment member.

In the automatic plug mounting system for a vehicle body according to the exemplary form of the present disclosure, the attachment member may form an attachment surface corresponding to the shape of an insert portion of the plug.

In the automatic plug mounting system for a vehicle body according to the exemplary form of the present disclosure, the plug mounting tool may include a socket member which restrains the flange portion of the plug by force-fitting.

In the automatic plug mounting system for a vehicle body according to the exemplary form of the present disclosure, the handling robot may move the plug mounting tool toward the rotating plate and transfer the plugs loaded on the attachment members to the socket members by a set torque.

In the exemplary forms of the present disclosure, plugs with different specifications can be automatically mounted into the vehicle body in cooperation between the handling robot and the plug mounting tool, thereby preventing errors or failures in mounting the plugs into the vehicle body and preventing vehicle quality problems caused by these errors or failures.

Other effects that may be obtained or predicted by an exemplary form of the present disclosure will be disclosed explicitly or implicitly in a detailed description for an exemplary form of the present disclosure. That is, various effects predicted according to an exemplary form of the present disclosure will be disclosed in a detailed description to be provided below.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
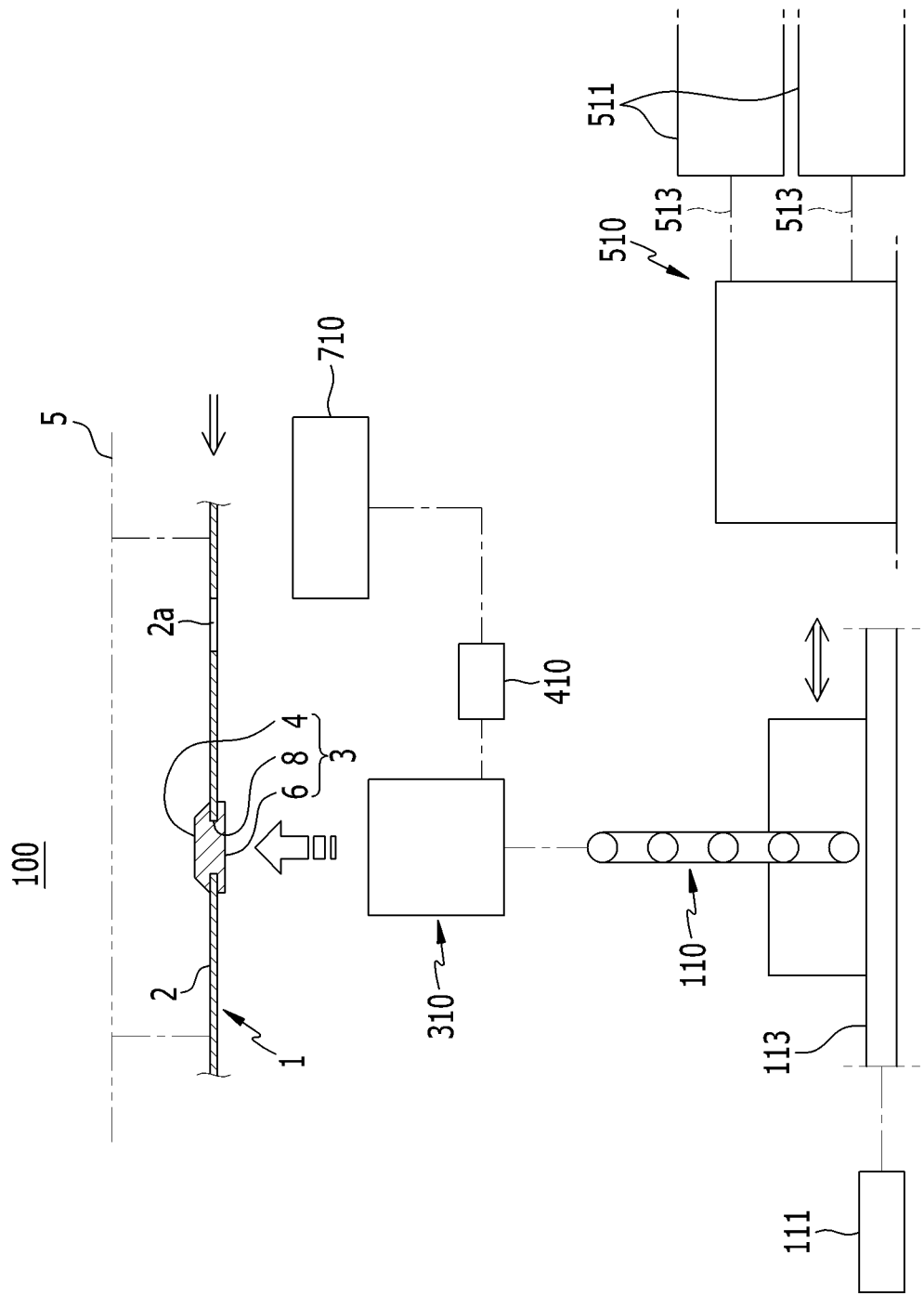
FIG. 1 is a block diagram schematically showing an automatic plug mounting system for a vehicle body according to an exemplary form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure will be described more fully hereinafter with reference to the accompanying drawings, in which exemplary forms of the present disclosure are shown. As those skilled in the art would realize, the described forms may be modified in various different ways, all without departing from the spirit or scope of the present disclosure.

Because the size and thickness of each configuration shown in the drawings are arbitrarily shown for better understanding and ease of description, the present disclosure is not limited thereto, and the thicknesses of portions and regions are exaggerated for clarity.

Further, in the following detailed description, names of constituents, which are in the same relationship, are divided into "the first', "the second", etc., but the present disclosure is not necessarily limited to the order in the following description.

Throughout the specification, unless explicitly described to the contrary, the word "comprise" and variations such as "comprises" or "comprising", will be understood to imply the inclusion of stated elements but not the exclusion of any other elements.

In addition, terms such as "unit", "means", "part", "member", etc., which are described in the specification, mean a unit of a comprehensive configuration that performs at least one function or operation.

FIG. 1 is a block diagram schematically showing an automatic plug mounting system for a vehicle body according to an exemplary form of the present disclosure.

Referring to FIG. 1, an automatic plug mounting system 100 for a vehicle body according to an exemplary form of the present disclosure may be applied to a fitting assembly line, which is a type of automobile assembly line, in which fittings such as various exterior and interior parts are assembled to a vehicle body 1.

For example, the exemplary form of the present disclosure may be applied to a fitting assembly process in which an engine, transmission, interiors, exteriors, etc. are assembled to the vehicle body 1, with its moving parts, such as the doors, trunk lid, and tail gate, assembled to it as vehicle body parts in a vehicle body assembly process.

Moreover, in the fitting assembly process, small fittings such as plugs 3 (also called "grommets" in this industry) related to the exemplary form of the present disclosure and cable assemblies are mounted to the vehicle body 1.

The plugs 3 are mounted to the lower structure of the vehicle body 1.

Hereinafter, a description will be made with an example in which the plugs 3 are mounted to a lower panel 2 of a vehicle body 1 being transferred along a transfer line 5 in the upper section of a workplace.

Here, the plugs 3 are mounted to a plurality of exhaust holes 2a formed in the lower panel 2. The plugs 3 are attached to the circumference of each exhaust hole 2a and fills the hole, and is made of a rubber material or plastic material.

The exhaust holes 2a may release the wash water and foreign materials involved in the washing of the vehicle body 1 and the paint, etc. used in the painting process of the vehicle body 1.

Moreover, the exhaust holes 2a also serve as welding gun-through holes through which a spot welding gun can pass and as tooling holes through which tooling pins of various types of jigs can be inserted.

The plugs 3 are attached to the circumference of each exhaust hole 2a, and may completely close the hole or have a hole through which a wire cable can pass. Such a plug 3 includes an insert portion 4 to be inserted into an exhaust hole 2a, and a flange portion 6 integrally connected to the insert portion 4 and supporting the circumference of the exhaust hole 2a in the lower panel 2.

A groove 8 that fits over the circumference of the exhaust hole 2a in the lower panel 2 is formed between the insert portion 4 and the flange portion 6. For example, the plug 3 may be an injection-molded rubber product which can be made elastically deformable so that the groove 8 fits over the circumference of the exhaust hole 2a in the lower panel 2.

However, the scope of protection of the present disclosure should not be understood as limited to mounting the plugs 3 to the exhaust holes 2a formed in the lower panel 2 of the vehicle body 1, and the technical spirit of the present disclosure may apply as long as plugs are assembled to holes drilled through panel parts of various types and purposes.

Typically, in this industry, the direction of transfer of the vehicle body is called the T direction, the width direction of the vehicle body is called the L direction, and the height direction of the vehicle body is called the H direction. However, the exemplary form of the present disclosure is described on the basis of the length, height, and width directions of the vehicle body, rather than on the basis of the aforementioned LTH directions.

Also, the following constituent elements will be explained below on the basis of a plug mounting tool 310 in an upright standing position to be described in further detail later, and the upward facing portion may be defined as a top edge, top portion, top end, or top surface, and the downward facing portion may be defined as a bottom edge, bottom portion, bottom end, or bottom surface.

However, the definitions of the above directional terms are relative and these definitions may vary with the positions of the exhaust holes 2a in the lower panel 2, the mounting positions of the plugs 3 relative to the exhaust holes 2a, and the reference position of the plug mounting tool 310. Accordingly, the aforementioned reference directions are not necessarily limited to those in this exemplary form.

Moreover, the term "end (one end or the other end)" may be defined as a certain end or as a certain portion (one edge or the other edge) including that end.

The automatic plug mounting system 100 for a vehicle body according to the exemplary form of the present disclosure is configured such that plugs 3 having different shapes and sizes at different positions depending on the specification of the vehicle body are automatically mounted to the exhaust holes 2a in the lower panel 2 of the vehicle body in cooperation with a robot.

To this end, the automatic plug mounting system 100 for a vehicle body according to the exemplary form of the present disclosure basically includes a handling robot 110, a plug mounting tool 310, and a plug transfer unit 510.

In the exemplary form of the present disclosure, the handling robot 110 is installed on the floor of the workplace, in the lower side of the transfer line 5.

The handling robot 110 carries out a robot action, following a teaching path set to correspond to the exhaust holes 2a in the vehicle body 1. Robot actions of the handling robot 110 are controlled by a robot controller (not shown). Also, the handling robot 110 is controlled by the robot controller (not shown) and carries out a robot action by a set torque.

The handling robot 110 moves along a given movement path on the floor of the workplace. For example, the handling robot 110 is slidably installed on a guide rail 113 by a driving part 111.

Here, the handling robot 110 is configured to reciprocate in the length direction of the vehicle body 1 along the guide rail 113.

The driving part 111 may include a well-known art transfer device that converts a motor's rotary motion into linear motion.

In the exemplary form of the present disclosure, when a cylinder is actuated, the plug mounting tool 310 serves to place the plugs 3 into the correct positions at the exhaust holes 2a in the vehicle body 1 while at least one of the plugs 3 is restrained.

The expression "restraining" refers to holding the plugs 3 to keep the plugs 3 from falling off the plug mounting tool 310 due to their self-weight or external force.

Also, the plug mounting tool 310 functions to mount the plugs 3 to the exhaust holes 2a by a robot action of the handling robot 110 when the plugs 3 have been placed into the correct positions at the exhaust holes 2a in the vehicle body 1.

That is, the handling robot 110 operates by a set torque while the plugs 3 have been placed into the correct positions at the exhaust holes 2a in the vehicle body 1 by means of the plug mounting tool 310, and is able to mount the plugs 3 restrained by the plug mounting tool 310 to the exhaust holes 2a.

Such a plug mounting tool 310 is installed at the front end of an arm of the handling robot 110. The configuration of the plug mounting tool 310 will be explained in more details below with reference to the following drawings.

Figure 2:
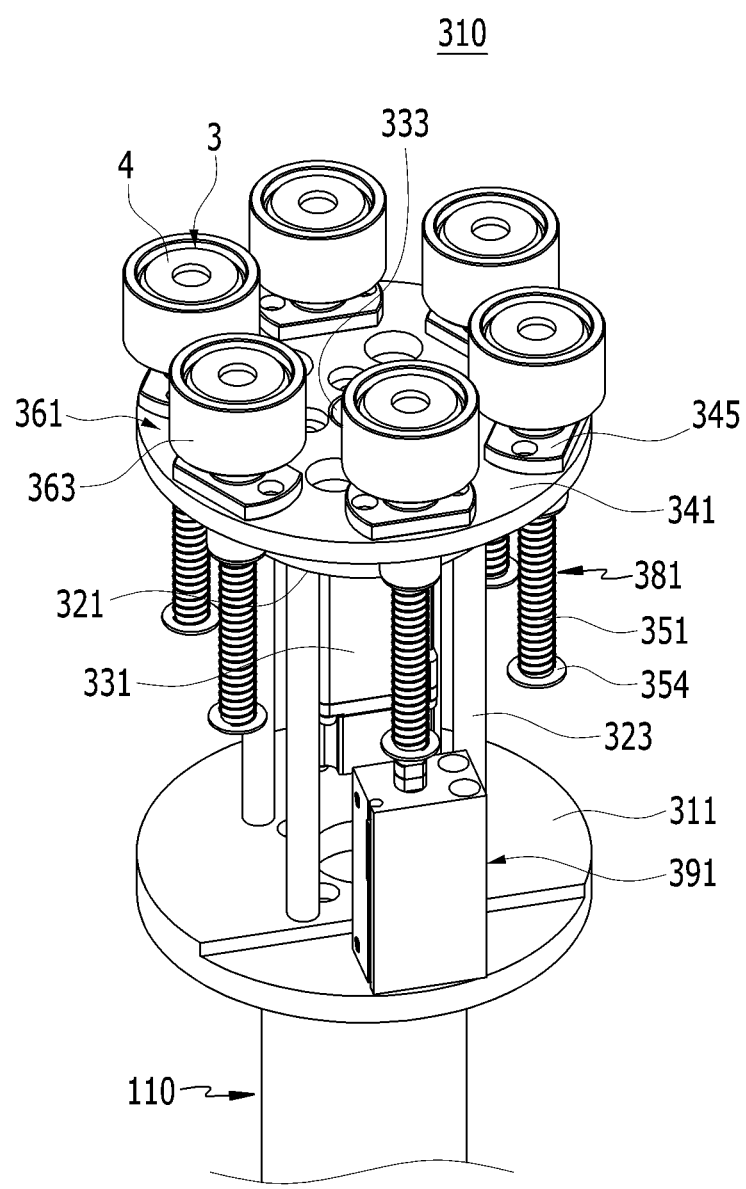
FIG. 2 and FIG. 3 are assembled perspective views showing a plug mounting tool applied to an automatic plug mounting system for a vehicle body according to an exemplary form of the present disclosure.
Figure 3:
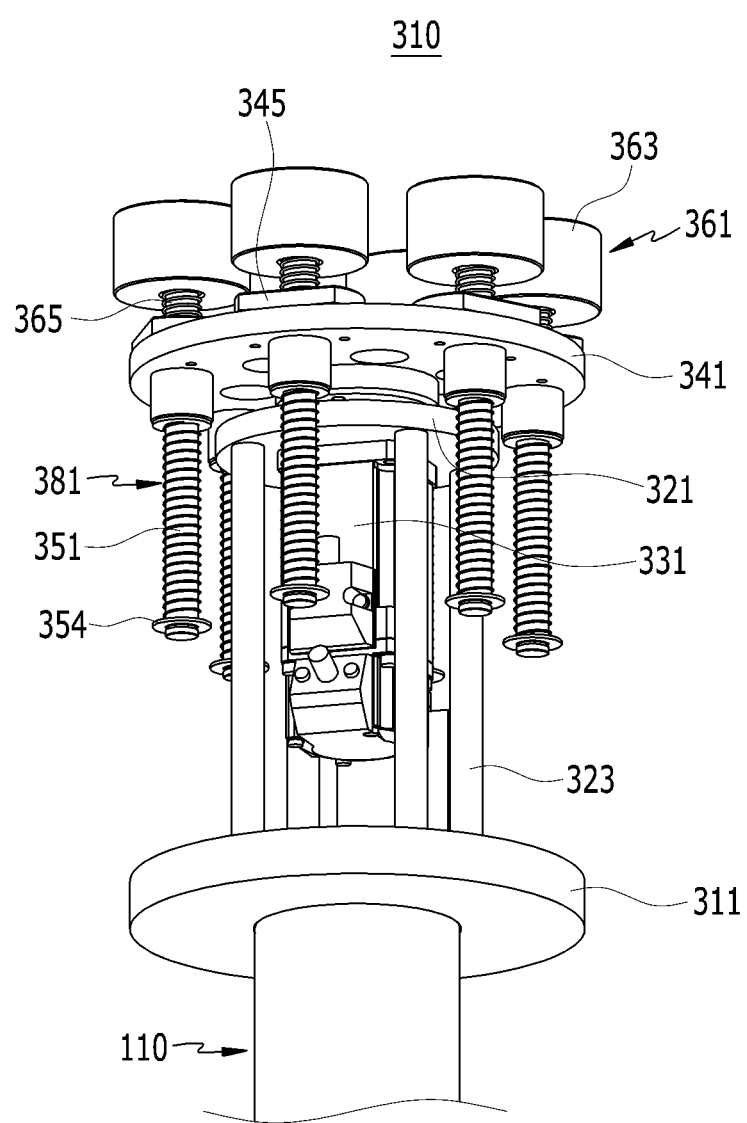
Figure 4:
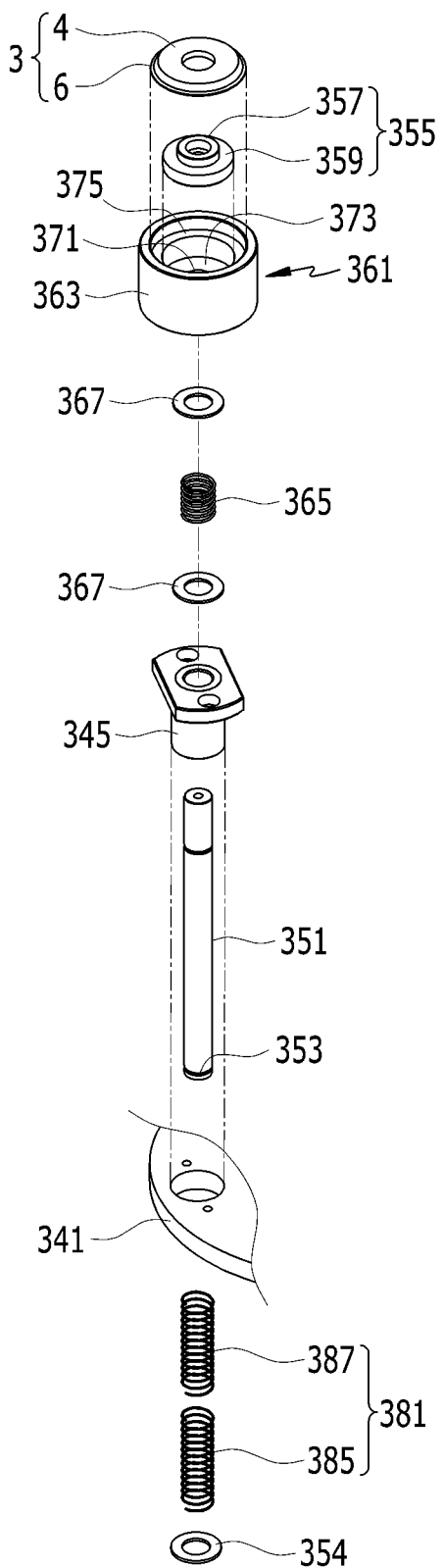
FIG. 4 is a partial exploded perspective view showing a plug mounting tool applied to an automatic plug mounting system for a vehicle body according to an exemplary form of the present disclosure.
Figure 5:
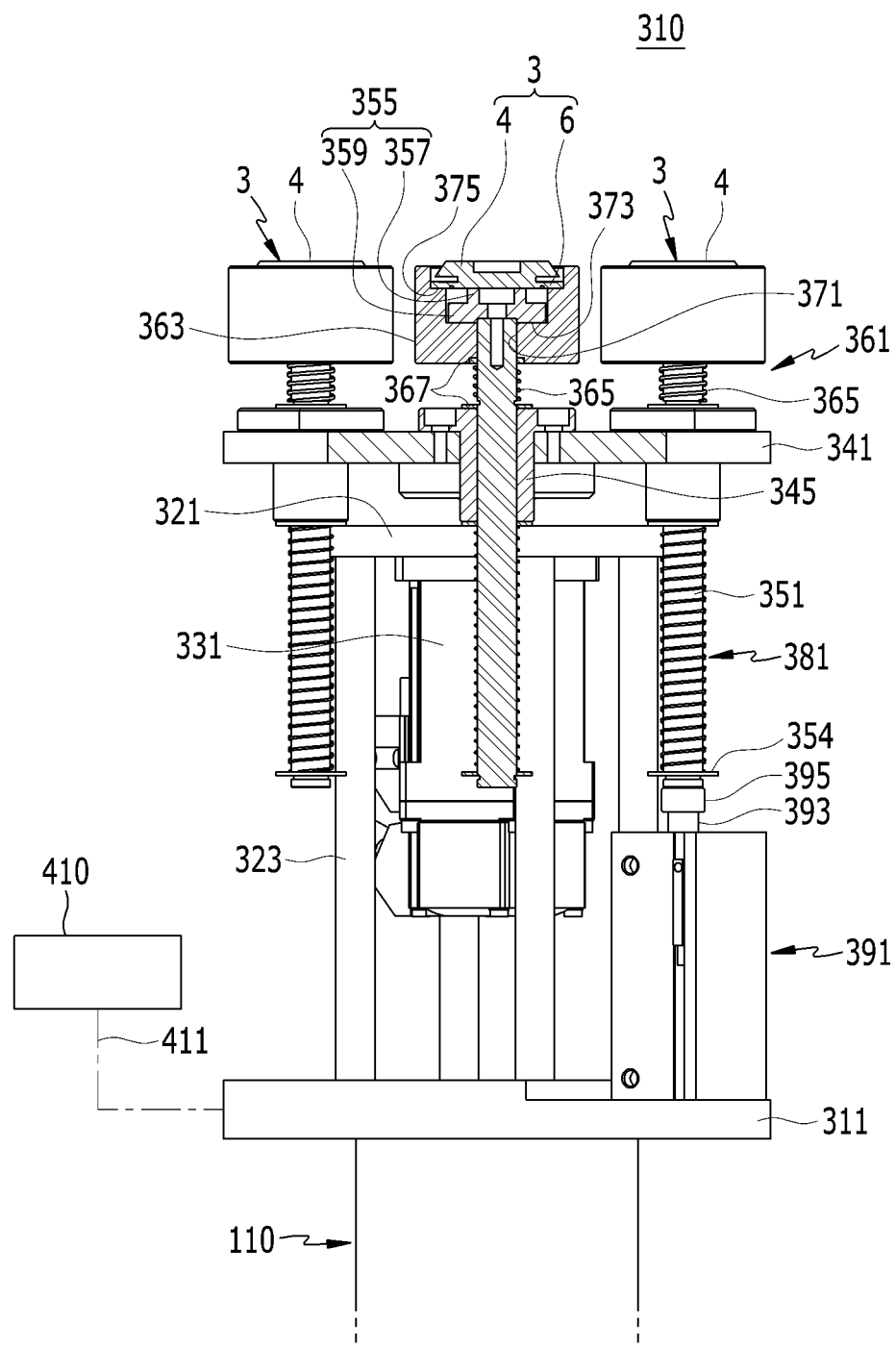
FIG. 5 is a partial cross-sectional view showing a plug mounting tool applied to an automatic plug mounting system for a vehicle body according to an exemplary form of the present disclosure.

FIG. 2 and FIG. 3 are assembled perspective views showing a plug mounting tool applied to an automatic plug mounting system for a vehicle body according to an exemplary form of the present disclosure. FIG. 4 is a partial exploded perspective view of FIG. 2 and FIG. 3. FIG. 5 is a partial cross-sectional view of FIG. 2 and FIG. 3.

Referring to FIGS. 2 to 5 along with FIG. 1, the plug mounting tool 310 according to the exemplary form of the present disclosure includes a base frame 311, a mount frame 321, a drive motor 331, a rotational frame 341, punch rods 351, a socket module 361, balance spring portions 381, and a driving cylinder 391.

In the exemplary form of the present disclosure, the base frame 311 is for mounting various components to be described below, and is fixedly installed at the front end of an arm of the handling robot 110. The base frame 311 may be a circular frame as shown in the drawings, or may come in a variety of other shapes.

Here, the base frame 311 may be fixed to the front end of an arm of the handling robot 110 by means of a tool changer (not shown) provided at the front end of the arm of the handling robot 110 or may be detached from the front end of the arm.

The base frame 311 may include accessories such as various brackets, support blocks, plates, housings, covers, and collars. The aforementioned accessories are for installing various components to be described below to the base frame 311. Thus, in the exemplary form of the present disclosure, the aforementioned accessories will be collectively referred to as the base frame 311 except in some cases.

In one exemplary form of the present disclosure, the mount frame 321 is used for mounting the drive motor 331 to be further explained later. With reference to the drawings, the mount frame 321 is installed in such a way that it is connected to the base frame 311 at a given distance from the top surface of the base frame 311. The mount frame 321 may be a circular frame as shown in the drawings, or may come in a variety of other shapes.

The mount frame 321 is placed above the base frame 311 at a given distance from the base frame 311, and may be connected to the base frame 311 through a plurality of supports 323.

In another exemplary form, the drive motor 331 is placed between the base frame 311 and the mount frame 321, and is fixedly installed on the bottom surface of the mount frame 321.

The drive motor 331 may be a typical servo motor that allows for servo control of rotational speed and rotational direction. Here, the drive axis 333 of the drive motor 331 penetrates the mount frame 321, and protrudes above the top surface of the mount frame 321.

In another form, the rotational frame 341 is placed above the mount frame 321 with reference to the drawings, is connected to the drive axis 333 of the drive motor 333, and can rotate when the drive motor 331 is actuated.

The rotational frame 341 may be a circular frame as shown in the drawings, or may come in a variety of other shapes.

In an exemplary form of the present disclosure, the punch rods 351 penetrate the circumference of the rotational frame 341, and are placed at given intervals along the rotational direction of the rotational frame 341. The punch rods 351 are configured to move vertically (with reference to the drawings) for a given number of strokes when the cylinder is actuated.

The punch rods 351 penetrate the rotational frame 341 from top down or from bottom to top. That is, one end (top end in the drawings) of the punch rods 351 penetrates the rotational frame 341 and protrudes above the top surface of the rotational frame 341.

Here, a ridge 353 serving as a rim that has a larger outer diameter than the rest of the punch rod 351 is formed at the other end (bottom end in the drawings) of the punch rod 351.

Meanwhile, in the exemplary form of the present disclosure, rod guides 345 to which one end of each punch rod 351 is fitted are installed on the rotational frame 341 to guide the strokes of the punch rod 351. Each rod guide 345 has a through-hole for inserting the punch rod 351, and is fixedly installed to a through-hole on the circumference of the rotational frame 341.

In the exemplary form of the present disclosure, the socket module 361 is for restraining the plugs 3, and is installed at one end of the punch rod 351 penetrating the rotational frame 341 through the rod guide 345. The socket module 361 is configured to move forward and backward through the punch rod 351 which strikes when the cylinder is actuated. Moreover, the socket module 361 is installed at one end of the punch rod 351 in such a way that it can reciprocate elastically along the axis of the punch rod 351.

The socket module 361 includes a socket member 363. The socket member 363 may restrain the aforementioned flange portion 6 of the plug 3 by force-fitting.

The socket member 363 is fitted into one end of the punch rod 351 in such a way as to move along the axis of the punch rod 351.

For example, the socket member 363 takes the shape of a cup which is open at the top and has a bottom surface at the bottom, with reference to the drawings. The socket member 363 supports the rod guide 345 and one end of the punch rod 351 through the bottom surface from the top side of the rotational frame 341.

Also, the socket member 363 restrains the flange portion 6 of the plug 3 by force-fitting. In this case, the insert portion 4 of the plug 3 keeps partially protruding from the top end (open end) of the socket member 363.

Here, a supporting member 355 supporting the plug 3 and the socket member 363 is installed at one end of the punch rod 351.

The supporting member 355 consists of a first portion 357 and a second portion 359. The first portion 357 supports the center of the flange portion 6 of the plug 3.

Also, the second portion 359 is placed at a different elevation from the first portion 357, and supports the inside bottom surface of the socket member 363 and the circumference of the flange portion 6.

The socket member 363 is formed with a through-hole 371 in the inside bottom through which one end of the punch rod 351 passes. Also, a first supporting ridge 373 supporting the second portion 359 of the supporting member 355 and a second supporting member 375 supporting the circumferential edge of the flange portion 6 of the plug 3 are formed on the inside wall surface of the socket member 363.

The socket member 363 described above comes in and out of contact with the circumference of the exhaust hole 2a in the vehicle body 1 by an action of the handling robot 110, and is configured to reciprocate elastically along the axis of the punch rod 351.

To this end, a return spring 365 is installed at one end of the punch rod 351 to exert an elastically repelling force to the socket member 363.

One end (bottom end in the drawings) of the return spring 365 is supported on one snap ring 367 installed at one end of the punch rod 351, and the other end (top end in the drawings) of the return spring 365 is supported on the bottom of the socket member 363 through another snap ring 367.

In the exemplary form of the present disclosure, the balance spring portion 381 is for maintaining a balance between the punch rod 351 and the rotational frame 341. The balance spring portion 381 may inhibit or prevent the punch rod 351 from swaying when the plug mounting tool 310 is moved by the handling robot 110.

The balance spring portion 381 is fitted to the punch rod 351 along the axis and placed between the other end of the punch rod 351 and the rotational frame 341. Each balance spring portion 381 includes a first spring 385 and a second spring 387.

The first spring 385 supports the aforementioned ridge 353 of the punch rod 351 through a washer 354, and the second spring 387 supports the rod guide 345 of the rotational frame 341.

The first and second springs 385 and 387 described above are held in a partially compressed state between the ridge 353 of the punch rod 351 and the rod guide 345 of the rotational frame 341. Here, the first spring 385 has a higher elastic coefficient than the second spring 387.

Here, the first and second springs 385 and 387 are compressed by the forward movement of the punch rod 351 when the cylinder is moved forward, and provide an elastic restoring force to the punch rod 351 when the cylinder is moved backward. The punch rod 351 is therefore moved backward to the original position by the elastic restoring force.

In the exemplary form of the present disclosure, the driving cylinder 391 is for providing a cylinder actuating force (forward or backward force) to the punch rod 351 to strike the punch rod 351.

The driving cylinder 391 is fixedly installed to the base frame 311. The driving cylinder 391 is pneumatically actuated, and may push the other end of the punch rod 351 through an actuating rod 393. To this end, a pusher 395 for pushing the other end of the punch rod 351 is installed at the leading edge of the actuating rod 393.

Meanwhile, referring to FIGS. 1 to 5, the plug mounting tool 310 according to the exemplary form of the present disclosure includes a vision sensor 410 that captures visions of the exhaust holes 2a in the vehicle body 1 and the plugs 3 mounted to the exhaust holes 2a and outputs vision data to a controller 710.

The vision sensor 410 is installed on the base frame 311 in the plug mounting tool 310. For example, the vision sensor 410 is fixedly installed to the outer circumference of the base frame 311 through a mounting bracket 411.

Here, the vision sensor 410 may capture visions of the exhaust holes 2a in the vehicle body 1 and output vision data to the controller 710, when the plug mounting tool 310 has been moved to a given position by means of the handling robot 110.

Then, the controller 710 may measure the positions of the exhaust holes 2a by analyzing the vision data obtained from the vision sensor 410, and may calibrate the position of the plug mounting tool 310 by the handling robot 110 based on the measurement results.

Moreover, the vision sensor 410 may capture visions of the plugs 3 mounted to the exhaust holes 2a in the vehicle body 1 and output vision data to the controller 710. Then, the controller 710 may determine whether the plugs 3 are mounted to the exhaust holes 2a or not by analyzing the vision data obtained from the vision sensor 410.

Referring to the previously disclosed FIG. 1, the plug transfer unit 510 is for transferring plugs 3 with different specifications fed through at least a pair of feeders 511 to the plug mounting tool 310.

Here, the pair of feeders 511 are typical feeding devices which can accommodate multiple plugs 3 and transfer the plugs 3 along a given feeding line 513 by a vibration force coming from a vibration source.

Figure 6:
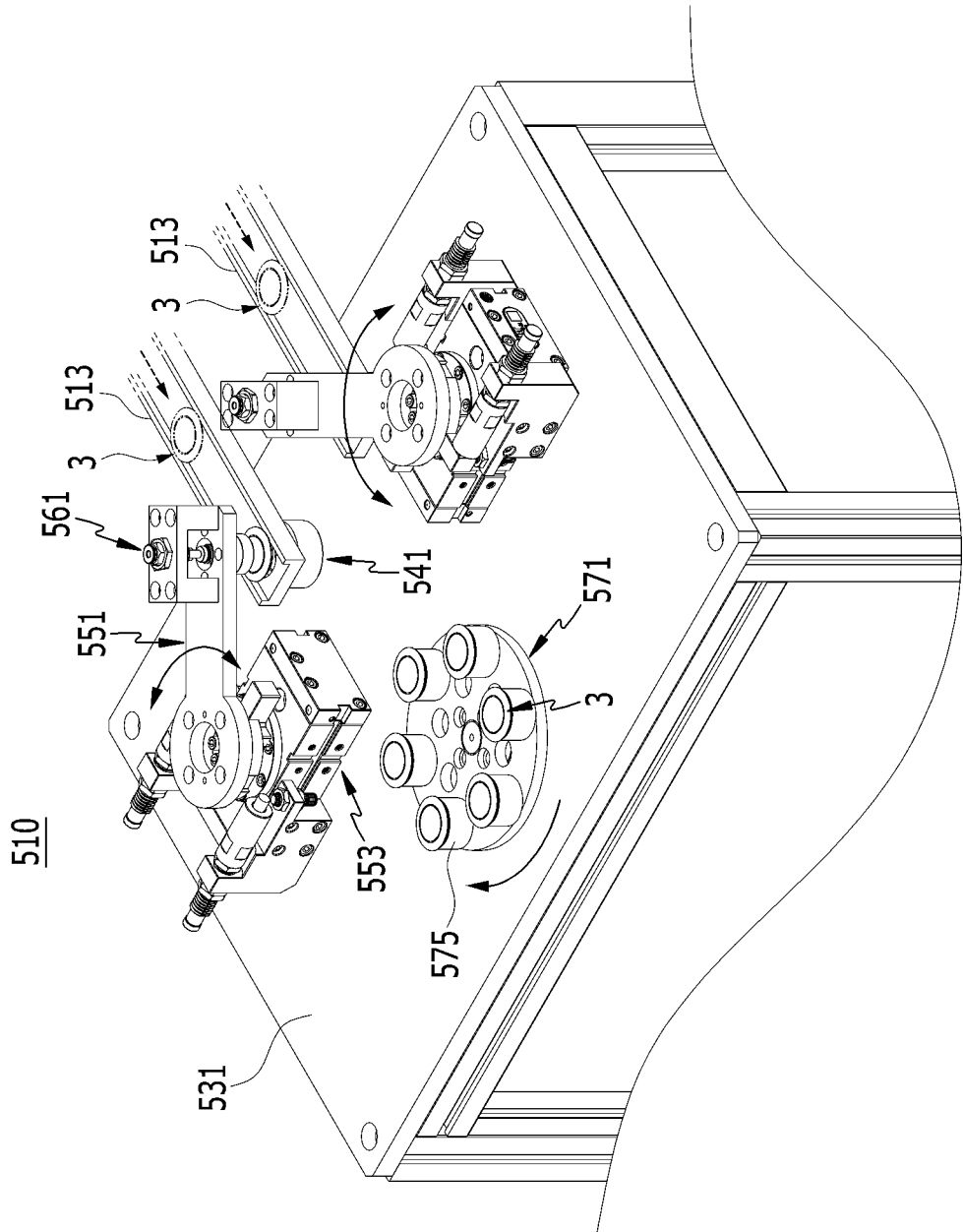
FIG. 6 is a perspective view showing a plug transfer unit applied to an automatic plug mounting system for a vehicle body according to an exemplary form of the present disclosure.
Figure 7:
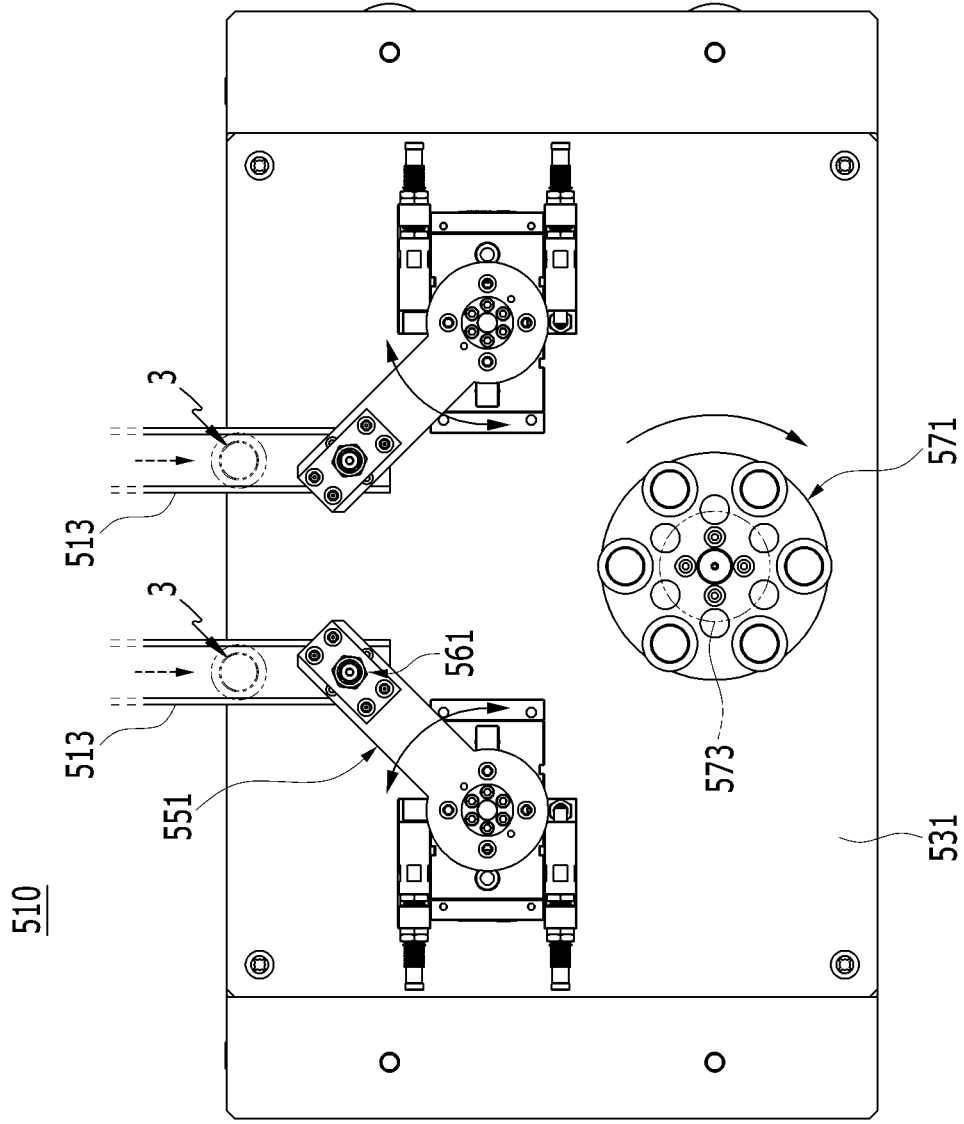
FIG. 7 is a plan view showing a plug transfer unit applied to an automatic plug mounting system for a vehicle body according to an exemplary form of the present disclosure.

FIG. 6 is a perspective view showing a plug transfer unit applied to an automatic plug mounting system for a vehicle body according to an exemplary form of the present disclosure. FIG. 7 is a plan view showing a plug transfer unit applied to an automatic plug mounting system for a vehicle body according to an exemplary form of the present disclosure.

Referring to FIGS. 6 and 7 along with FIG. 1, the plug transfer unit 510 in the exemplary form of the present disclosure includes a transfer frame 531, a plug pick-up cylinder 541, a swivel member 551, a plug unloading cylinder 561, and a rotating plate 571.

The transfer frame 531 is for mounting various components to be explained below, and is installed on the floor of the workplace. The transfer frame 531 may include accessories such as various brackets, support blocks, plates, housings, covers, and collars. The aforementioned accessories are for installing various components to be described below to the transfer frame 531. Thus, in the exemplary form of the present disclosure, the aforementioned accessories will be collectively referred to as the transfer frame 531 except in some cases.

The transfer frame 531 is connected to the aforementioned feeding line 513, and the feeding line 513 is spaced apart from the top surface of the transfer frame 531. Here, a stopper (not shown) for stopping a plug 3 being transferred along the feeding line 513 may be installed on the feeding line 513. Positioned above the feeding line 513, the stopper moves forward and backward in a vertical direction as the cylinder is actuated, and may selectively stop the transfer of the plugs 3 through the feeding line 513.

Figure 8:
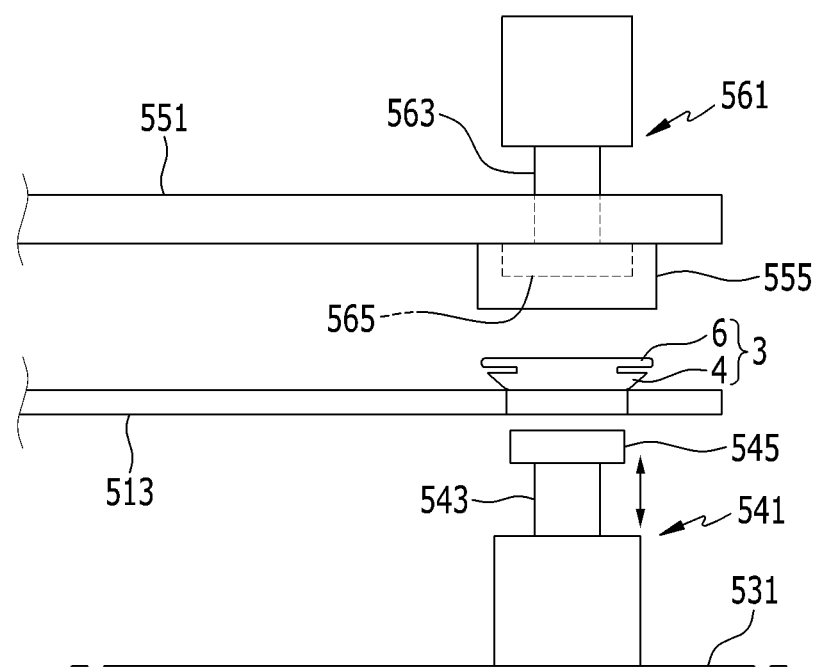
FIG. 8 is a view showing a plug pick-up cylinder part applied to a plug transfer unit in an automatic plug mounting system for a vehicle body according to an exemplary form of the present disclosure.

In the exemplary form of the present disclosure, the plug pick-up cylinder 541 is for picking up a plug 3 transferred to the end of the feeding line 513 in an upward direction, as shown in FIG. 8.

The plug pick-up cylinder 541 is installed on the transfer frame 531 so as to correspond to the end of the feeding line 513 connected to a pair of feeders 511. For example, when there are a pair of feeders 511, a pair of plug pick-up cylinders 541 are installed on the transfer frame 531.

The plug pick-up cylinder 541 is pneumatically actuated, and includes a pick-up punch 545 installed at the leading edge of an actuating rod 543. The pick-up punch 545 positioned below the feeding line 513 is moved forward and backward in a vertical direction by the actuating rod 543 of the plug pick-up cylinder 541, and may pick up the plug 3 positioned at the end of the feeding line 513 in an upward direction. Here, the pick-up punch 545 may pick up the plug 3 in an upward direction through a hole or slot formed at the end of the feeding line 513. Also, the pick-up punch 545 may support the insert portion 4 of the plug 3 from the bottom and pick up the plug 3 in an upward direction.

In the exemplary form of the present disclosure, the swivel member 551 is rotatably installed on the transfer frame 531, corresponding to the end of each feeding line 513. For example, when there are a pair of feeders 511, a pair of swivel members 551 are installed on the transfer frame 531.

The swivel member 551 takes the shape of a bracket with a given length, and may be rotated by a first actuator 553. The first actuator 553 may include a well-known art motor. Here, one end of the swivel member 551 is connected to the first actuator 553.

Figure 9:
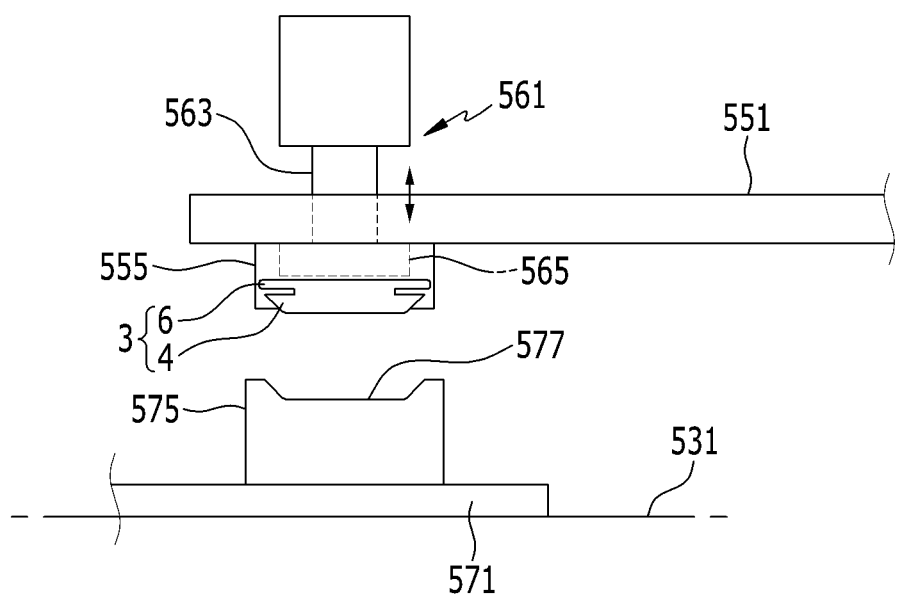
FIG. 9 is a view showing a plug unloading cylinder and attachment member part applied to a plug transfer unit in an automatic plug mounting system for a vehicle body according to an exemplary form of the present disclosure.

Moreover, as shown in FIGS. 8 and 9, the swivel member 551 includes a pick-up socket that restrains the plug 3 picked up in an upward direction by the pick-up punch 545 as the plug pick-up cylinder 541 is actuated.

The pick-up socket 555 is fixedly installed at the other end of the swivel member 551—that is, to the bottom surface of the swivel member 551. The pick-up socket 555 has an open cross-section that opens downward.

Here, the pick-up socket 555 restrains the flange portion 6 of the plug 3 by force-fitting. In this case, the insert portion 4 of the plug 3 keeps partially protruding from the bottom end (open end) of the socket member 363.

In the exemplary form of the present disclosure, the plug unloading cylinder 561 is for unloading the plug 3 restrained by the pick-up socket 555 of the swivel member 551 in a downward direction. The plug unloading cylinder 561 is installed on the top surface of the swivel member 551, corresponding to the pick-up socket 555.

The plug unloading cylinder 561 is pneumatically actuated, and includes an unloading punch 565 installed at the leading edge of an actuating rod 563 penetrating the pick-up socket 555.

The unloading punch 565 is moved forward and backward in a vertical direction by the actuating rod 563 of the plug unloading cylinder 561, and may unload the plug 3 restrained by the pick-up socket 555 in a downward direction. Here, the unloading punch 565 may support the flange portion 6 of the plug 3 from the top and unload the plug 3 in a downward direction.

In the exemplary form of the present disclosure, the rotating plate 571 is rotatably installed on the transfer frame 531 by a second actuator 573. The second actuator 573 may include a well-known art motor. The rotating plate 571 may be a circular frame as shown in the drawings, or may come in a variety of other shapes.

Moreover, a plurality of attachment members 575 are installed at given intervals along the circumference on the top surface of the rotating plate 571. Each of the attachment members 575 is for loading a plug 3 unloaded downward from the pick-up socket 555 by the unloading punch 565 as the plug unloading cylinder 561 is actuated.

The attachment member 575 forms an attachment surface 577 corresponding to the shape of the insert portion 4 of the plug 3. That is, when the plug 3 restrained by the pick-up socket 555 above the attachment member 575 is unloaded in a downward direction by the plug unloading cylinder 561, the plug 3 may be loaded onto the attachment surface 577 of the attachment member 575.

In the exemplary form of the present disclosure, when the socket members 363 of the plug mounting tool 310 are matched with the attachment members 575 while the plug mounting tool 310 is being moved toward the rotating plate 571 by means of the handling robot 110, the plugs 3 loaded on the attachment members 575 may be transferred to the socket members 363 by a torque set for the handling robot 110.

Hereinafter, the operation of the automatic plug mounting system 100 for a vehicle body according to the exemplary form of the present disclosure configured as above will be described in detail with reference to the previously disclosed drawings and the attached drawings.

FIGS. 10 to 18 are views for explaining the operation of an automatic plug mounting system for a vehicle body according to an exemplary form of the present disclosure.

Figure 10:
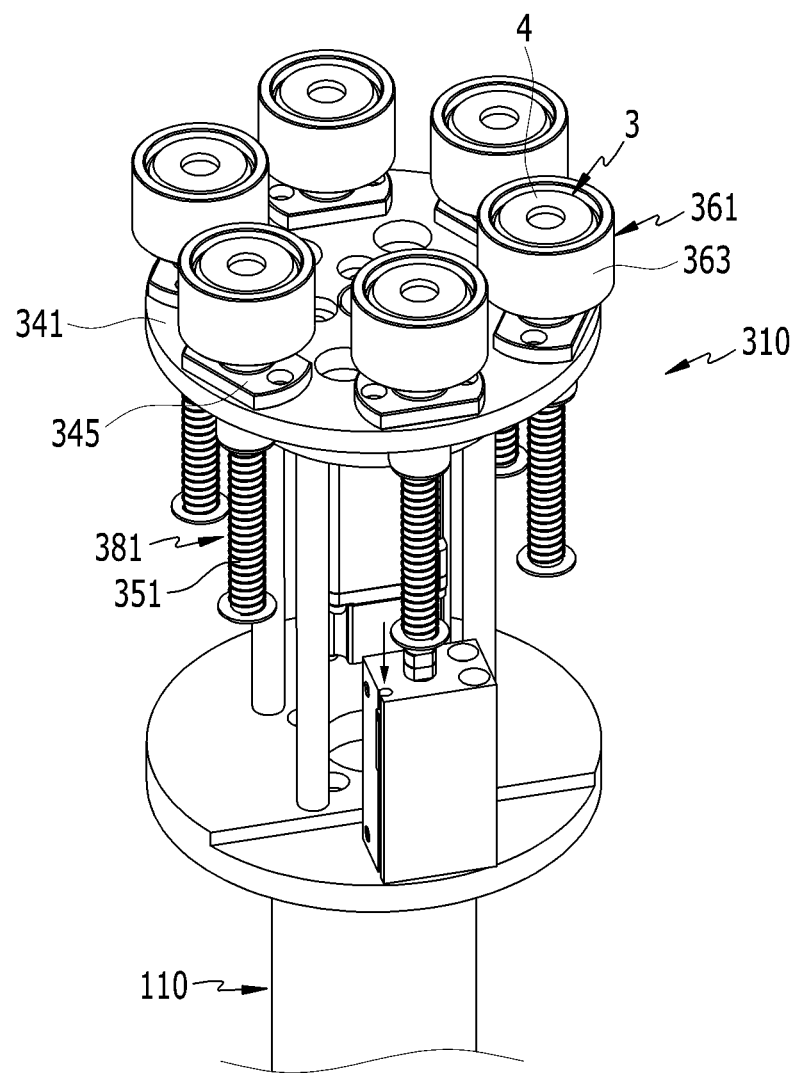
FIGS. 10 to 18 are views for explaining the operation of an automatic plug mounting system for a vehicle body according to an exemplary form of the present disclosure.

Referring to FIG. 10, firstly, in the exemplary form of the present disclosure, the plug mounting tool 410 is mounted to the front end of an arm of the handling robot 110, and plugs 3 with different specifications are restrained by the socket members 363 of the socket modules 361 in the plug mounting tool 310.

Here, the socket member 363 restrains the flange portion 6 of the plug 3 by force-fitting. Also, with reference to the drawings, the socket member 363 supports the rod guide 345 and one end of the punch rod 351 through the bottom surface from the top side of the rotational frame 341.

Moreover, the socket member 363 supports the supporting member 355 at one end of the punch rod 351 and restrains the plug 3, and the first supporting ridge 373 of the socket member 363 supports the second portion 359 of the supporting member 355. Also, the second supporting ridge 375 of the socket member 363 supports the circumferential edge of the flange portion 6 of the plug 3. In this case, the insert portion 4 of the plug 3 keeps partially protruding from the top end (open end) of the socket member 363.

In this case, the first and second springs 385 and 387 (see FIG. 4 hereinafter) of the balance spring portion 381 are held in a partially compressed state between the ridge 353 of the punch rod 351 and the rod guide 345 of the rotational frame 341.

In this state, in the exemplary form of the present disclosure, the plug mounting tool 310 is moved toward the lower portion of the vehicle body 1 by a robot action of the handling robot 110 during the process of transferring the vehicle body 1 along the transfer line 5 in the upper section of the workplace.

In this case, the punch rod 351 is being elastically supported on the rotational frame 341 by the first and second springs 385 and 387 of the balance spring portion 381. Here, the first spring 385 supporting the ridge 353 of the punch rod 351 has a higher elastic coefficient than the second spring 387 supporting the rod guide 345 of the rotational frame 341.

Accordingly, in the exemplary form of the present disclosure, the balance spring portion 381 maintains the balance of the punch rod 351 and keeps the punch rod from swaying, when the plug mounting tool 310 is moved by the handling robot 110.

In the exemplary form of the present disclosure, the vision sensor 410 may capture visions of the exhaust holes 2a in the vehicle body 1 and output vision data to the controller 710, when the plug mounting tool 310 has been moved to a given position by means of the handling robot 110.

Then, the controller 710 may measure the positions of the exhaust holes 2a by analyzing the vision data obtained from the vision sensor 410, and may calibrate the position of the plug mounting tool 310 by the handling robot 110 based on the measurement results.

Figure 11:
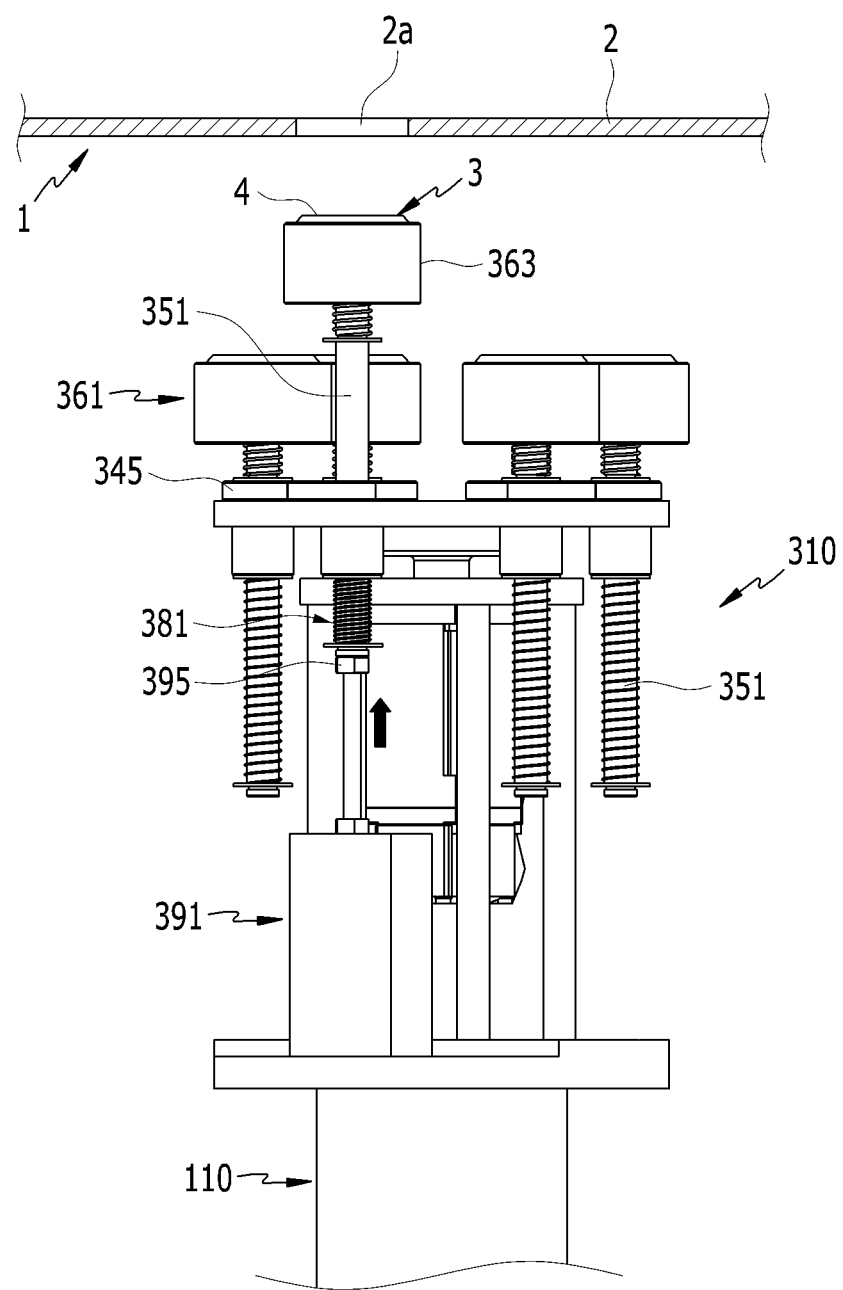

In this state, in the exemplary form of the present disclosure, as shown in FIG. 11, the socket module 361 restraining a plug 3 specified to be mounted to an exhaust hole 2a in the vehicle body 1 is placed in the correct position at the exhaust hole 2a as the driving cylinder 391 is actuated.

Specifically, in the exemplary form of the present disclosure, the driving cylinder 391 is actuated to move forward while the other end of the punch rod 351 supporting the socket module 361 is positioned at the pusher 395 of the driving cylinder 391.

Hereupon, the pusher 195 pushes the punch rod 351 while moving forward by the forward movement of the driving cylinder. Accordingly, in the exemplary form of the present disclosure, the socket module 361 restraining the plug 3 may be placed into the correct position at the exhaust hole 2a by moving the punch rod 351 forward by the pusher 395. Here, the expression "the correct position of the socket module 361" refers to a position where the plug 3 is spaced apart from the exhaust hole 2a by a given distance.

In this case, the first and second springs 385 and 387 of the balance spring portion 381 described above are compressed between the other end of the punch rod 251 and the rod guide 345 by the forward movement of the punch rod 351.

Figure 12:
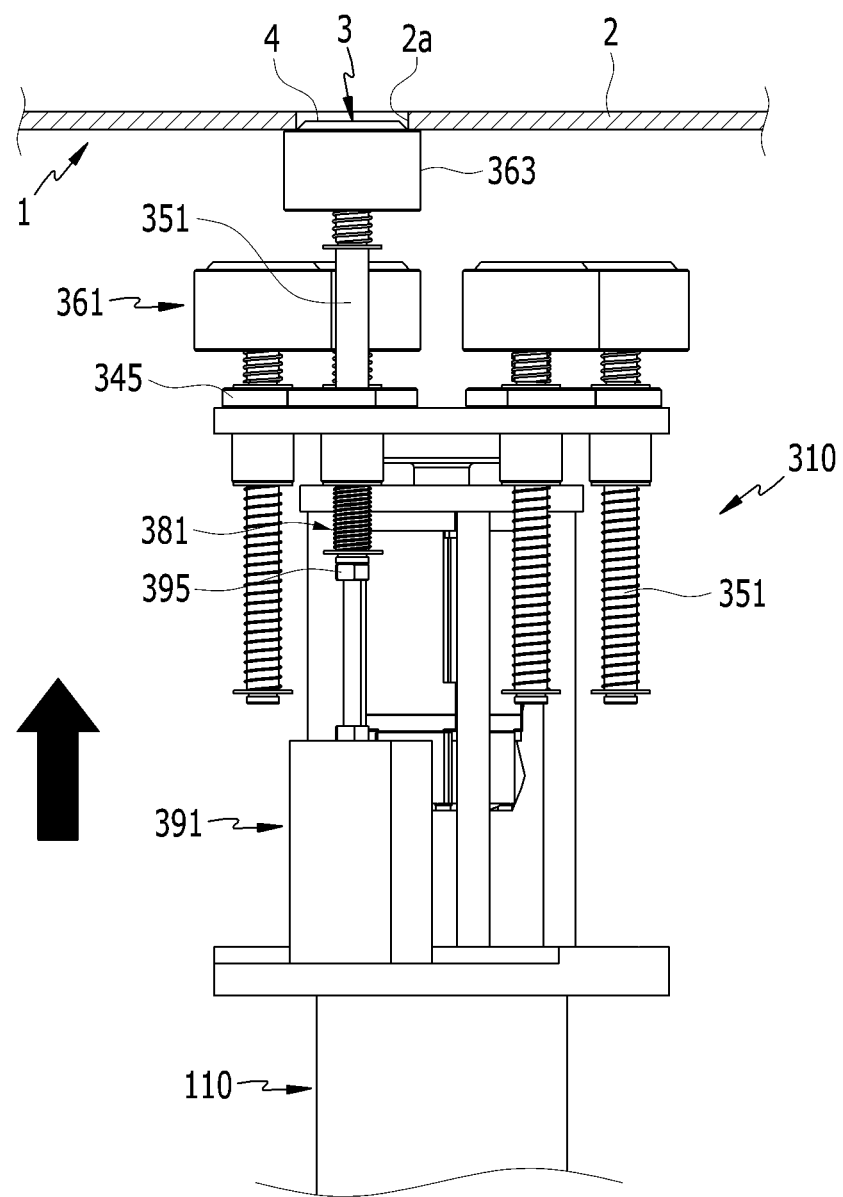

Then, in the exemplary form of the present disclosure, as shown in FIG. 12, a set torque is applied to the plug mounting tool 310 by a robot action of the handling robot 110, and the insert portion 4 of the plug 3 restrained by the socket member 363 of the socket module 361 is inserted into the exhaust hole 2a in the vehicle body 1.

In this process, with reference to the drawings, part of the insert portion 4 protruding from the top end (open end) of the socket member 363 is inserted into the exhaust hole 2a. Then, as part of the insert portion 4 is inserted into the exhaust hole 2a as described above, the socket member 363 comes into contact with the circumference of the exhaust hole 2a in the lower panel 2. In this state, in the exemplary form of the present disclosure, a set torque continues to be applied to the plug mounting tool 310 by a robot action of the handling robot 110.

Figure 13:
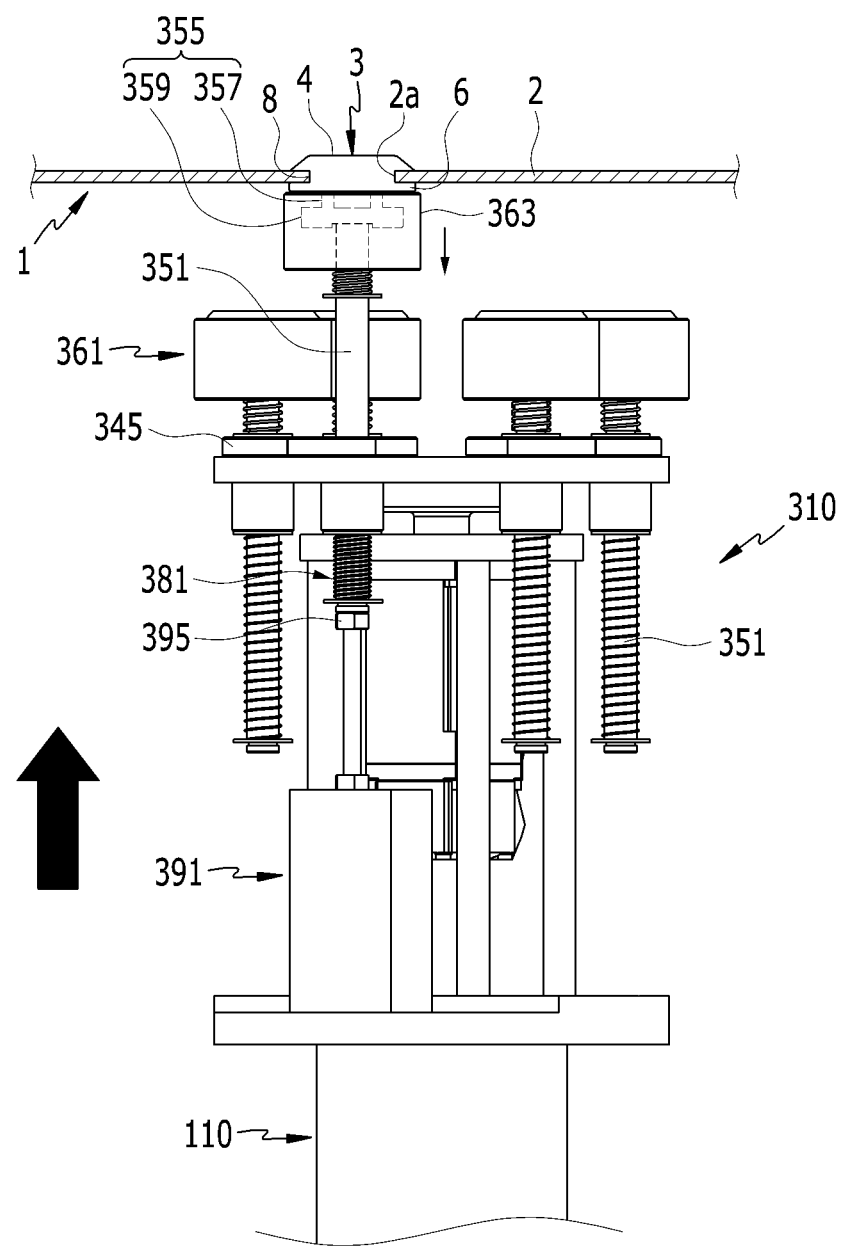

Then, as shown in FIG. 13, the socket member 363 overcomes the elastic force of the return spring 365 by the torque of the handling robot 110 and moves along the axis (downward in the drawings) of the punch rod 351.

In this process, in the exemplary form of the present disclosure, pressure is applied to the plug 3 through the supporting member 355 of the punch rod 351, and the plug 3 is removed from the socket member 363 and at the same time the entire insert portion 4 of the plug 3 is inserted into the exhaust hole 2a.

In the exemplary form of the present disclosure, the first portion 357 of the supporting member 355 applies primary pressure to the center of the flange portion 6, and the second portion 359 of the supporting member 355 applies secondary pressure to the circumference of the flange portion 6, thereby fully inserting the insert portion 4 into the exhaust hole 2a. Hereupon, the plug 3 is fitted to the circumference of the exhaust hole 2a in the lower panel 2 through the groove 8 between the insert portion 4 and the flange portion 6 and mounted to the vehicle body 1.

In the exemplary form of the present disclosure, when the plug 3 has been mounted as described above, the plug mounting tool 310 is moved apart from the vehicle body 1 by a robot action of the handling robot 110.

Then, in the exemplary form of the present disclosure, the socket member 363 of the socket module 361 moves back to the original position by the elastic restoring force of the return spring 365 as it is spaced apart from the lower panel 2 of the vehicle body 1.

Figure 14:
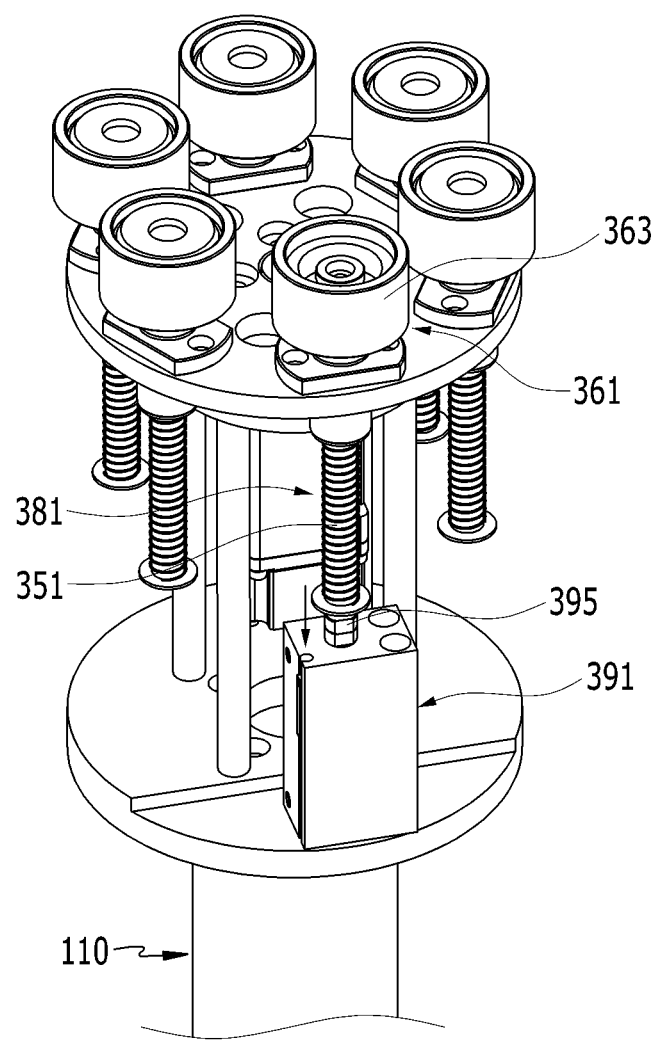

Next, in the exemplary form of the present disclosure, as shown in FIG. 14, the driving cylinder 391 is actuated to move backward. Hereupon, the pusher 395 is moved backward by the backward movement of the driving cylinder 391, and the punch rod 351 moves backward to the original position by the elastic restoring force of the balance spring portion 381.

In the process described above, in the exemplary form of the present disclosure, the vision sensor 410 captures visions of the plugs 3 mounted to the exhaust holes 2a in the vehicle body 410, and outputs vision data to the controller 710.

Hereupon, the controller 710 determines whether the plugs 3 are mounted to the exhaust holes 2a or not by analyzing the vision data obtained from the vision sensor 410, and externally displays the determination results and the mounting history.

Figure 15:
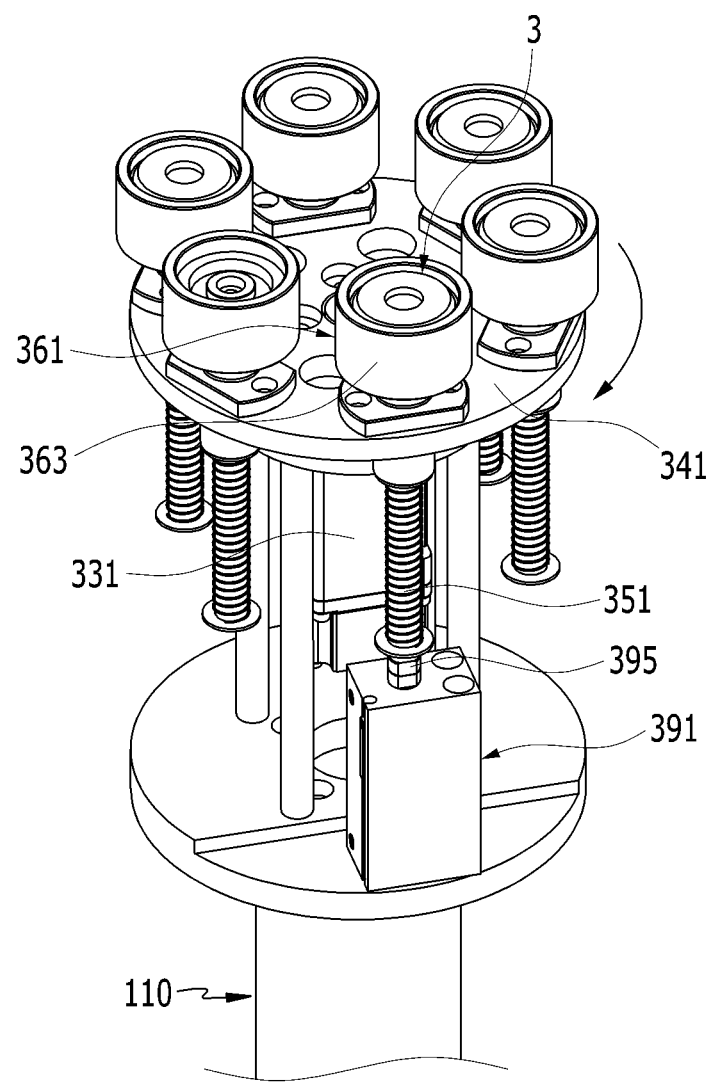

Then, in the exemplary form of the present disclosure, in order to mount a plug 3 with a different specification into a different exhaust hole 2a in the vehicle body 1, the rotational frame 341 is rotated in one direction by a given distance by actuating the driving motor 331 as shown in FIG. 15.

Thus, the socket module 361 which restrains the plug 3 with a different specification by the socket member 363 is positioned at the driving cylinder 391, and the other end of the punch rod 351 supporting the socket module 361 is positioned at the pusher 395 of the driving cylinder 391.

In this state, in the exemplary form of the present disclosure, plugs 3 with different specifications may be automatically mounted into the exhaust holes 2a in the vehicle body 1 through the above described series of processes, in cooperation with a robot.

Meanwhile, in the exemplary form of the present disclosure, when the plugs 3 restrained by the socket modules 361 of the plug mounting tool 310 are all mounted into the exhaust holes 2a of the vehicle body 1, the plug mounting tool 310 is moved to the plug transfer unit 510 by an action of the handling robot 110.

Then, in the exemplary form of the present disclosure, new plugs 3 may be transferred to the socket modules 361 of the plug mounting tool 310 in cooperation among the handling robot 110, the plug mounting tool 310, and the plug transfer unit 510.

The transfer process of the plugs 3 will be explained concretely. Firstly, in the exemplary form of the present disclosure, plugs 3 with different specifications are transferred along a feeding line 513 through a feeder 511.

Figure 16:
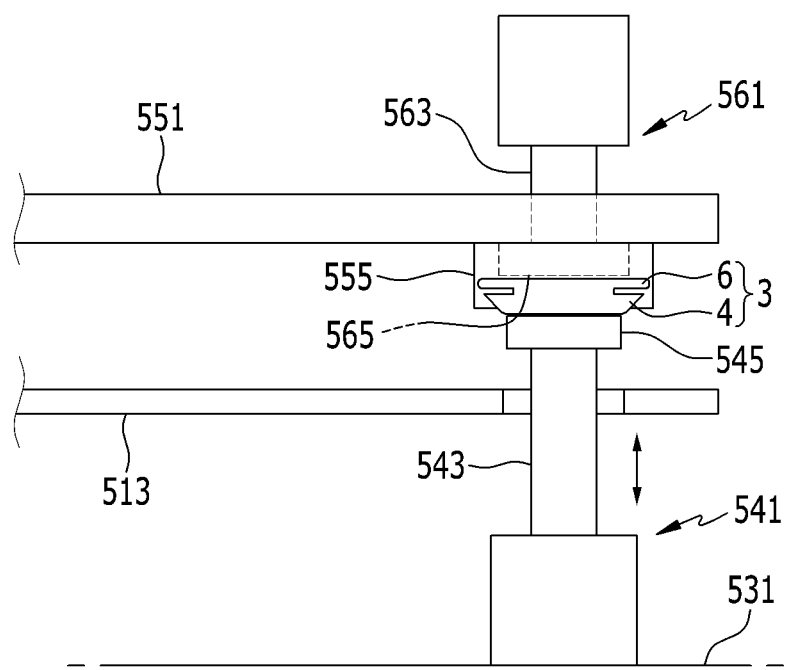

In this process, in the exemplary form of the present disclosure, as shown in FIG. 16, while the plug 3 is positioned at the end of the feeding line 513, the transfer of plugs 3 through the feeding line 513 is stopped, and the plug pick-up cylinder 541 is actuated to move forward.

Then, in the exemplary form of the present disclosure, as the pick-up punch 545 positioned below the feeding line 513 is moved forward in an upward direction by the actuating rod 543 of the plug pick-up cylinder 541, it picks up the plug 3 positioned at the end of the feeding line 513 in an upward direction.

Here, the swivel member 551 rotates as the first actuator 553 is actuated, and the pick-up socket 555 is positioned at the end of the feeding line 513. Thus, the pick-up socket 555 restrains the flange portion 6 of the plug 3 picked up in an upward direction by the pick-up punch 545 when the plug pick-up cylinder 541 is actuated.

Figure 17:
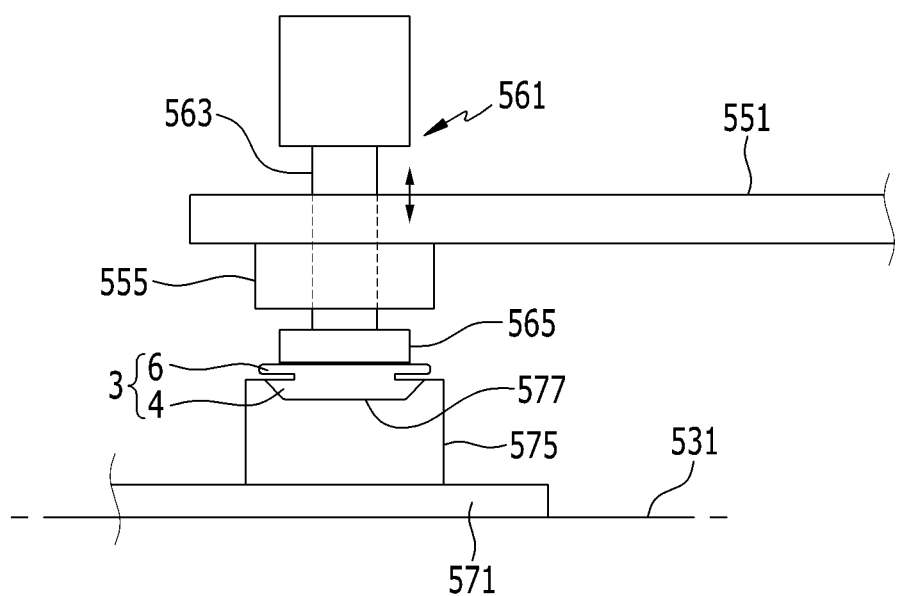

Then, in the exemplary form of the present disclosure, the swivel member 551 is rotated toward the rotating plate 571 as the first actuator 553 is actuated. In this case, as shown in FIG. 17, the pick-up socket 555 restraining the plug 3 is positioned above one of the attachment members 575 on the rotating plate 571. In this state, the plug unloading cylinder 561 is actuated to move forward.

Thus, as the unloading punch 565 is moved forward in a downward direction by the actuating rod 563 of the plug unloading cylinder 561, the plug 3 restrained by the pick-up socket 555 may be unloaded from the pick-up socket 555 and loaded onto the attachment member 575 on the rotating plate 571. At this time, the attachment member 575 supports the insert portion 4 of the plug 3 through the attachment surface 577.

In this state, in the exemplary form of the present disclosure, plugs 3 with different specifications are loaded onto the attachment members 575 on the rotating plate 571 through the above described series of processes, when the rotating plate 571 is rotated in one direction for a given distance by actuating the second actuator 573.

Figure 18:
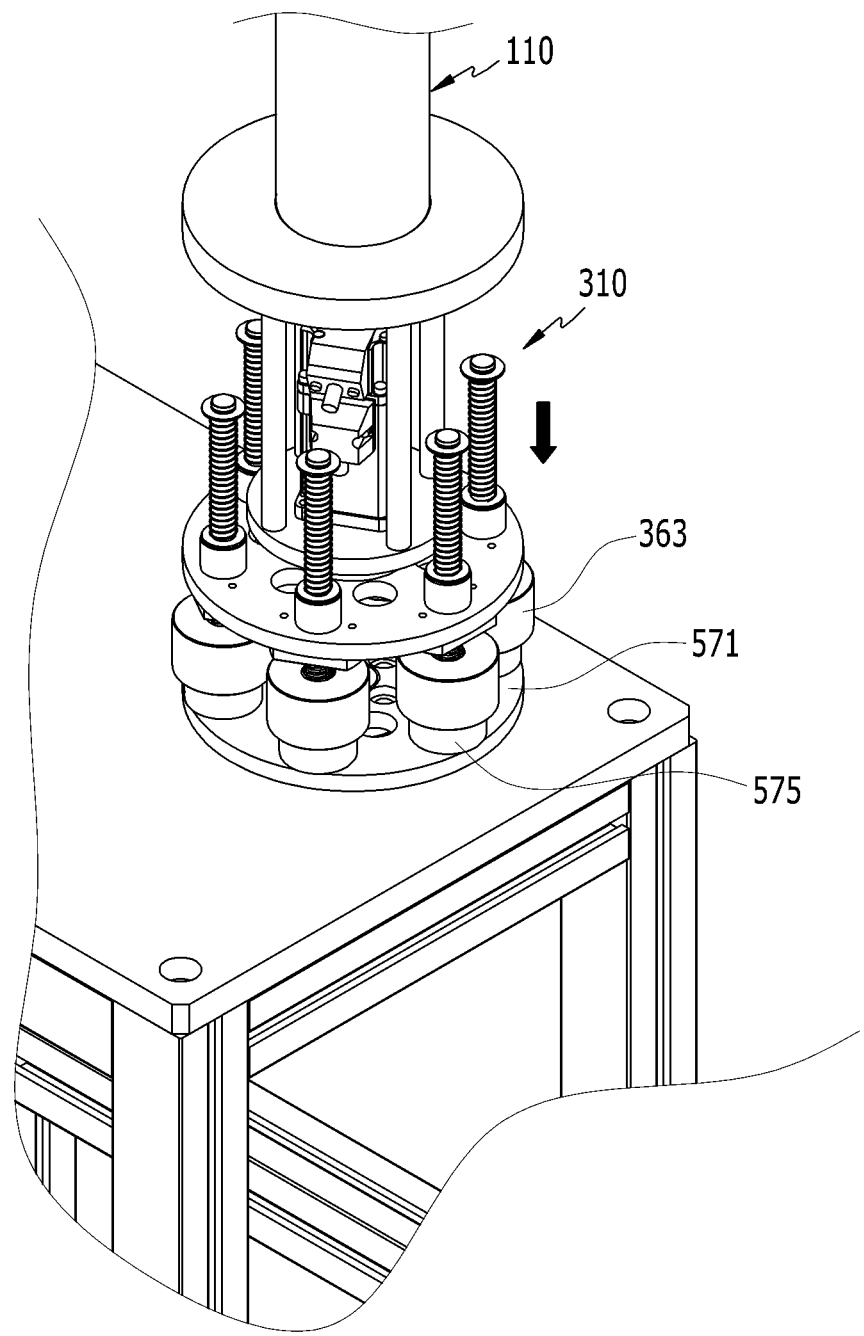

Afterwards, in the exemplary form of the present disclosure, as shown in FIG. 18, the socket members 363 of the plug mounting tool 310 are matched with the attachment members 575 while the plug mounting tool 310 is being moved toward the rotating plate 571 by means of the handling robot 110.

Accordingly, in the exemplary form of the present disclosure, the plugs 3 loaded on the attachment members 575 may be transferred to the socket members 363 by a torque set for the handling robot 110.

According to the automatic plug mounting system 100 for a vehicle body, plugs 3 having different shapes and sizes at different positions depending on the specification of the vehicle body are automatically mounted to the exhaust holes 2a in the lower panel 2 of the vehicle body in cooperation with a robot.

As such, it is possible to reduce the amount of man hours and number of workers needed for manual plug mounting operation and prevent musculoskeletal disorders in workers from repetitive-motion work.

Moreover, in the exemplary form of the present disclosure, plugs 3 with different specifications can be automatically mounted into the vehicle body 1 in cooperation between the handling robot 110 and the plug mounting tool 310, thereby preventing errors or failures in mounting the plugs 3 into the vehicle body and preventing vehicle quality problems caused by these errors or failures.

Furthermore, in the exemplary form of the present disclosure, it is possible to monitor how the plugs 3 are mounted and if the plugs 3 fall out, and this allows for managing plug mounting quality data records through computerization.

Although the exemplary forms of the present disclosure have been described above, the technical spirit of the present disclosure is not limited to the exemplary forms proposed in this specification. Those skilled in the art who understand the technical spirit of the present disclosure may easily propose other exemplary forms by supplementing, changing, deleting, and adding constituent elements within a range of the same technical spirit. However, those supplements, changes, deletions, and additions may be construed as falling within the range of the present disclosure.

| <Description of symbols> | |
| --- | --- |
| 1: vehicle body | 2: lower panel |
| 2a: exhaust hole | 3: plug |
| 4: insert portion | 5: transfer line |
| 6: flange portion | 8: groove |
| 100: automatic plug mounting system for vehicle body | |
| 110: handling robot | |
| 111: driving part | 113: guide rail |
| 310: plug mounting tool | 311: base frame |
| 321: mount frame | 323: support |
| 331: drive motor | 333: drive axis |
| 341: rotational frame | 345: rod guide |
| 351: punch rod | 353: ridge |

-continued

<Description of symbols>

| | |
|---|---|
| 355: supporting member | 357: first portion |
| 359: second portion | 361: socket module |
| 363: socket member | 365: return spring |
| 367: snap ring | 371: through-hole |
| 373: first supporting ridge | 375: second supporting ridge |
| 381: balance spring portion | 385: first spring |
| 387: second spring | 391: driving cylinder |
| 393, 543, 563: actuating rod | 395: pusher |
| 410: vision sensor | 411: mounting bracket |
| 510: plug transfer unit | 511: feeder |
| 513: feeding line | |
| 531: transfer frame | 541: plug pick-up cylinder |
| 545: pick-up punch | 551: swivel member |
| 553: first actuator | 555: pick-up socket |
| 561: plug unloading cylinder | 565: unloading punch |
| 571: rotating plate | 573: second actuator |
| 575: attachment member | 577: attachment surface |
| 710: controller | |

What is claimed is:

1. An automatic plug mounting system for a vehicle body, which is for automatically mounting a plurality of plugs into exhaust holes in a vehicle body being transferred along a transfer line, the system comprising:
a handling robot configured to operate along a teaching path set to correspond to the exhaust holes; and
a plug mounting tool installed at an arm of the handling robot and configured to respectively place the plurality of plugs into corresponding positions at the exhaust holes by actuating a cylinder of the plug mounting tool while at least one of the plurality of plugs is restrained,
wherein the handling robot is configured to apply a set torque to the plug mounting tool and the plug mounting tool is configured to mount the plurality of plugs restrained by the plug mounting tool into the exhaust holes by the torque applied by the handling robot.

2. The automatic plug mounting system of claim 1, wherein the plug mounting tool comprises a socket module configured to move forward and backward through a punch rod which operates when the cylinder is actuated.

3. The automatic plug mounting system of claim 2, wherein
the socket module comprises a socket member which restrains a flange portion of a plug of the plurality of plugs by force-fitting.

4. The automatic plug mounting system of claim 3, wherein
the socket member comes in and out of contact with a circumference of the exhaust holes in the vehicle body by an action of the handling robot, and is configured to reciprocate elastically along an axis of the punch rod.

5. An automatic plug mounting system for a vehicle body, which is for automatically mounting a plurality of plugs into exhaust holes in a vehicle body being transferred along a transfer line in an upper section of a workplace, the system comprising:
a handling robot configured to operate along a teaching path set to correspond to the exhaust holes;
a base frame fixed to a front end of an arm of the handling robot;
a mount frame connected to the base frame through a plurality of supports, at a given distance from the base frame;
a driving motor fixed to the mount frame;
a rotational frame connected to a drive axis of the driving motor;
a plurality of punch rods configured to penetrate a circumference of the rotational frame and placed at given intervals along a rotational direction of the rotational frame;
a socket module installed at a first end of a corresponding punch rod of the plurality of punch rods configured to penetrate the rotational frame, the socket module configured to reciprocate elastically along an axis of the corresponding punch rod of the plurality of punch rods;
a balance spring portion fitted to the corresponding punch rod and placed between the rotational frame and a second end of the corresponding punch rod;
and a driving cylinder fixed to the base frame and configured to push the second end of the corresponding punch rod through an actuating rod.

6. The automatic plug mounting system of claim 5, wherein
the handling robot is slidably installed on a guide rail in a longitudinal direction of the vehicle body by a driving part on a floor of the workplace.

7. The automatic plug mounting system of claim 5, wherein
rod guides are installed on the rotational frame and configured to receive the plurality of punch rods so as to guide strokes of the plurality of punch rods.

8. The automatic plug mounting system of claim 5, wherein
the socket module comprises:
a socket member fitted into the first end of the corresponding punch rod of the plurality of punch rods and configured to move along the axis of the corresponding punch rod and restrain a flange portion of a plug of the plurality of plugs by force-fitting; and
a return spring installed at the first end of the corresponding punch rod and configured to exert an elastically repelling force to the socket member.

9. The automatic plug mounting system of claim 8, wherein
a snap ring is installed at the first end of the corresponding punch rod and configured to support the return spring.

10. The automatic plug mounting system of claim 8, wherein
a supporting member supporting the plug and the socket member is installed at the first end of the corresponding punch rod,
wherein the supporting member comprises:
a first portion supporting a center of the flange portion of the plug; and
a second portion placed at a different elevation from the first portion and configured to support an inside bottom surface of the socket member and a circumference of the flange portion.

11. The automatic plug mounting system of claim 10, wherein
the socket member is formed with a through-hole in the inside bottom surface through which the first end of the corresponding punch rod passes,
a first supporting ridge supporting the second portion and a second supporting member supporting a circumferential edge of the flange portion of the plug are formed on an inside wall surface of the socket member.

12. The automatic plug mounting system of claim 5, wherein the balance spring portion comprises:
a first spring supporting the second end of the corresponding punch rod; and
a second spring having a higher elastic coefficient than the first spring and supporting the rotational frame.

13. The automatic plug mounting system of claim 5, wherein
a pusher configured to push the second end of the corresponding punch rod is installed at a leading edge of the actuating rod.

14. The automatic plug mounting system of claim 5, wherein
a vision sensor is installed on the base frame through a mounting bracket.

15. An automatic plug mounting system for a vehicle body, which is for automatically mounting plugs into exhaust holes in a vehicle body being transferred along a transfer line, the system comprising:
a handling robot configured to operate along a teaching path set to correspond to the exhaust holes;
a plug mounting tool installed at an arm of the handling robot and configured to place the plugs into positions at the exhaust holes when a cylinder of the plug mounting tool is actuated, while at least one of the plugs is restrained, the plug mounting tool configured to mount the plugs to the exhaust holes by a set torque applied to the plug mounting tool by the handling robot; and
a plug transfer unit configured to transfer plugs with different specifications fed through at least a pair of feeders to the plug mounting tool.

16. The automatic plug mounting system of claim 15, wherein the plug transfer unit comprises: a transfer frame;
a plug pick-up cylinder which is installed on the transfer frame at a position corresponding to ends of feeding lines transferring the plugs fed from each feeder, the plug pick-up cylinder configured to pick up at least one of the plugs in an upward direction;
a swivel member including a pick-up socket configured to restrain a flange portion of the at least one plug picked up by the plug pick-up cylinder by force-fitting, the swivel member rotatably installed on the transfer frame by a first actuator;
a plug unloading cylinder installed on the swivel member and configured to unload the at least one plug restrained by the pick-up socket in a downward direction; and
a rotating plate including a plurality of attachment members configured to load the at least one plug unloaded by the plug unloading cylinder, the rotating plate rotatably installed on the transfer frame by a second actuator.

17. The automatic plug mounting system of claim 16, wherein the plug pick-up cylinder comprises a pick-up punch installed at a leading edge of an actuating rod, the pick-up punch configured to pick up at least one of the plugs positioned below one of the feeding lines in an upward direction.

18. The automatic plug mounting system of claim 16, wherein
the plug unloading cylinder comprises an unloading punch installed at a leading edge of an actuating rod penetrating the pick-up socket and configured to unload at least one of the plugs positioned above the plurality of attachment members.

19. The automatic plug mounting system of claim 16, wherein
the plurality of attachment members includes an attachment surface corresponding to a shape of an insert portion of the plugs.

20. The automatic plug mounting system of claim 16, wherein
the plug mounting tool comprises a socket member configured to restrain the flange portion of the at least one plug by force-fitting, and
the handling robot moves the plug mounting tool toward the rotating plate and transfers the plugs loaded on the plurality of attachment members to the socket members by a set torque.

* * * * *